(12) United States Patent
Römer

(10) Patent No.: US 11,040,637 B2
(45) Date of Patent: Jun. 22, 2021

(54) LINEAR ACTUATOR FOR A MOTOR VEHICLE SEAT

(71) Applicant: Faurecia Autositze GmbH, Stadthagen (DE)

(72) Inventor: Bernd Römer, Stadthagen (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 0 days.

(21) Appl. No.: 16/400,782

(22) Filed: May 1, 2019

(65) Prior Publication Data
US 2019/0337413 A1 Nov. 7, 2019

(30) Foreign Application Priority Data

May 2, 2018 (DE) .................. 20 2018 102 446.9
Apr. 30, 2019 (DE) .................. 10 2019 111 242.7

(51) Int. Cl.
*F16M 13/00* (2006.01)
*B60N 2/06* (2006.01)
*B60N 2/02* (2006.01)
*B60N 2/08* (2006.01)

(52) U.S. Cl.
CPC .......... *B60N 2/067* (2013.01); *B60N 2/0232* (2013.01); *B60N 2/08* (2013.01); *B60N 2002/024* (2013.01)

(58) Field of Classification Search
CPC ............... B60N 2/0224; B60N 2/0232; B60N 2002/0236
See application file for complete search history.

(56) References Cited

U.S. PATENT DOCUMENTS

| 5,172,601 A | * | 12/1992 | Siegrist .................. B60N 2/233 74/89.36 |
| 5,575,531 A | | 11/1996 | Gauger et al. |
| 7,252,278 B2 | | 8/2007 | Garrido |
| 7,506,557 B2 | | 3/2009 | Hosokai et al. |
| 2017/0008423 A1 | * | 1/2017 | Stanic .................. B60N 2/0232 |

FOREIGN PATENT DOCUMENTS

EP 1 365 939 5/2007

OTHER PUBLICATIONS

German Search Report dated Sep. 4, 2018 with respect to counterpart German patent application 20 2018 102 446.9.
Translation of German Search Report dated Sep. 4, 2018 with respect to counterpart German patent application 20 2018 102 446.9.

* cited by examiner

*Primary Examiner* — Amy J. Sterling
(74) *Attorney, Agent, or Firm* — Henry M. Feiereisen LLC

(57) ABSTRACT

A linear actuator for adjusting a seat component of a motor vehicle seat includes a lead screw having a rod head. A fastening means is connected to the rod head and connectable to a first seat component of the motor vehicle seat. The first seat component has a bearing, with the fastening means being insertable into the bearing in a first orientation and lockable in the bearing in a second orientation.

17 Claims, 5 Drawing Sheets

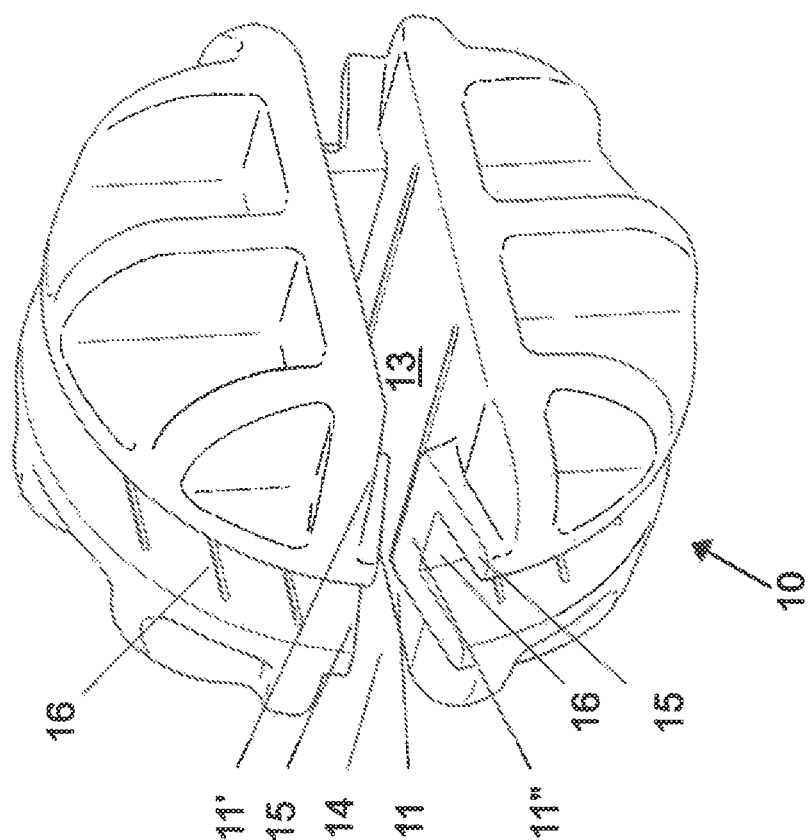
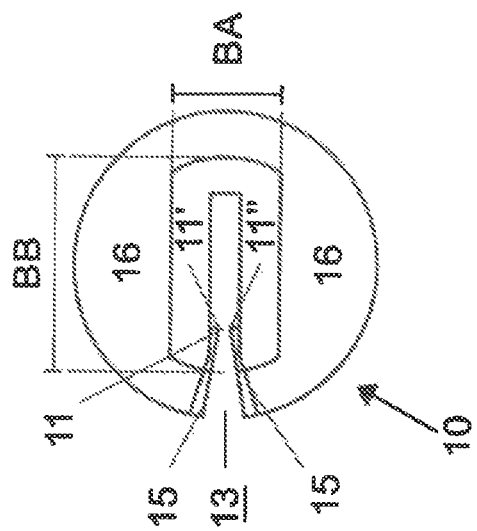
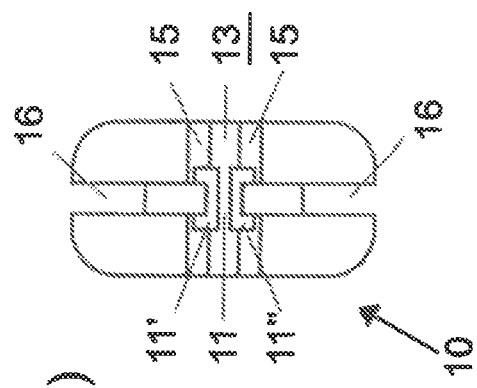

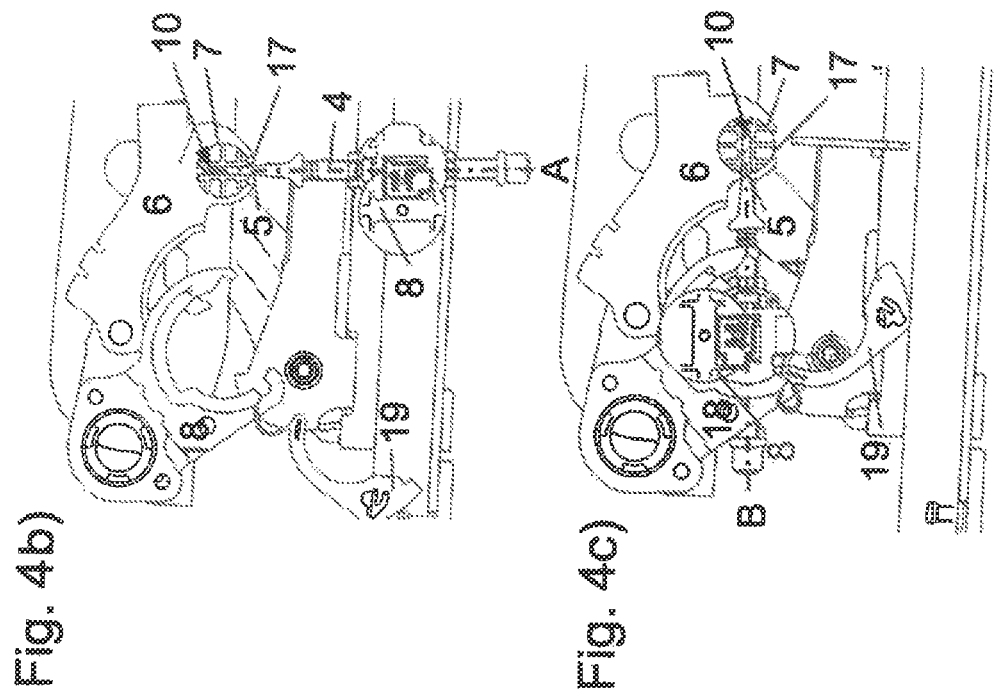
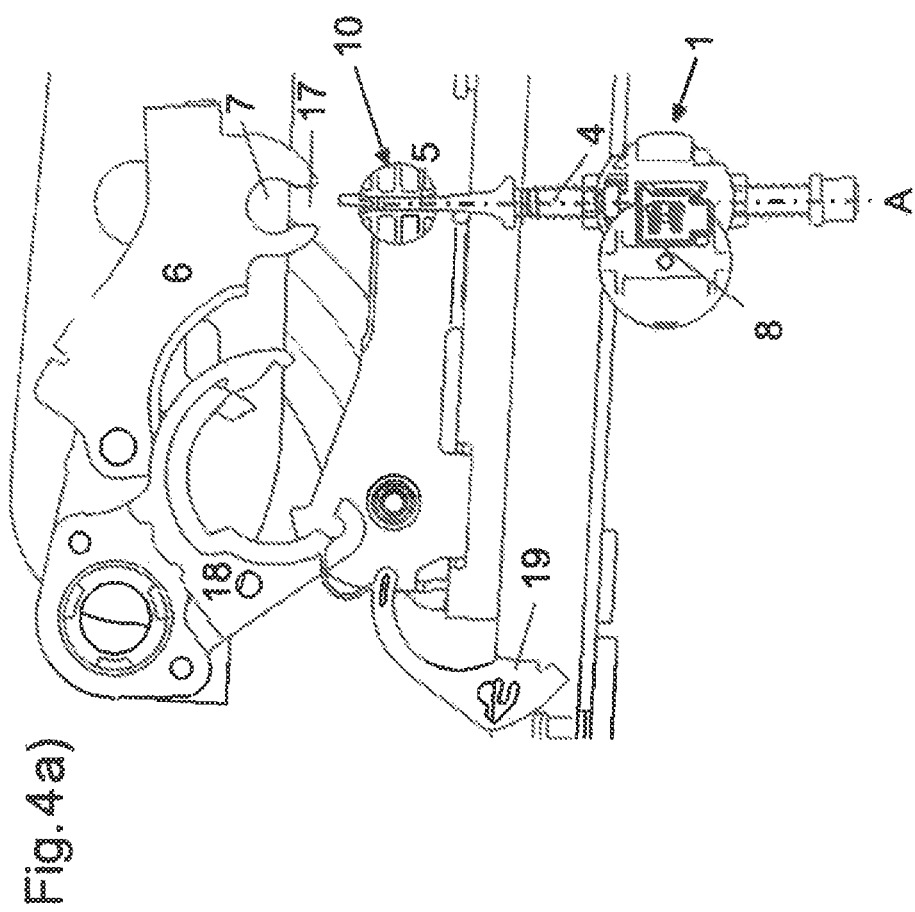

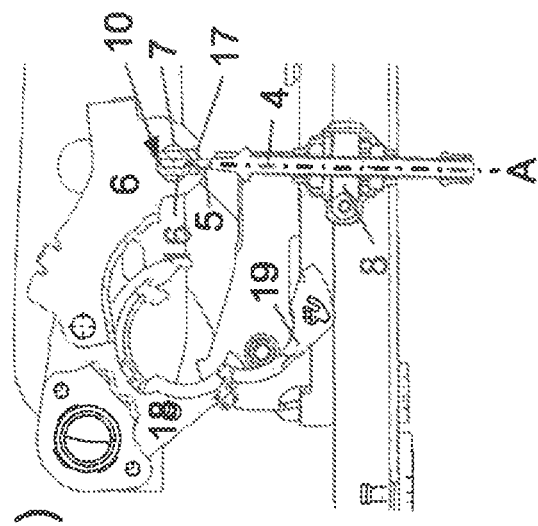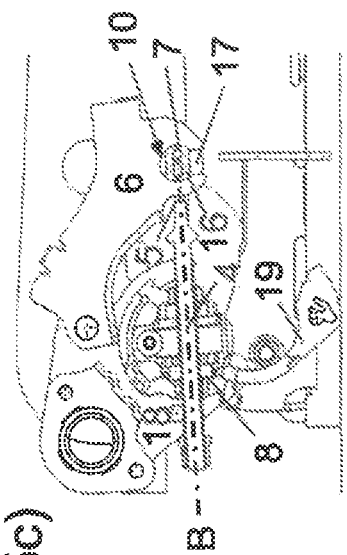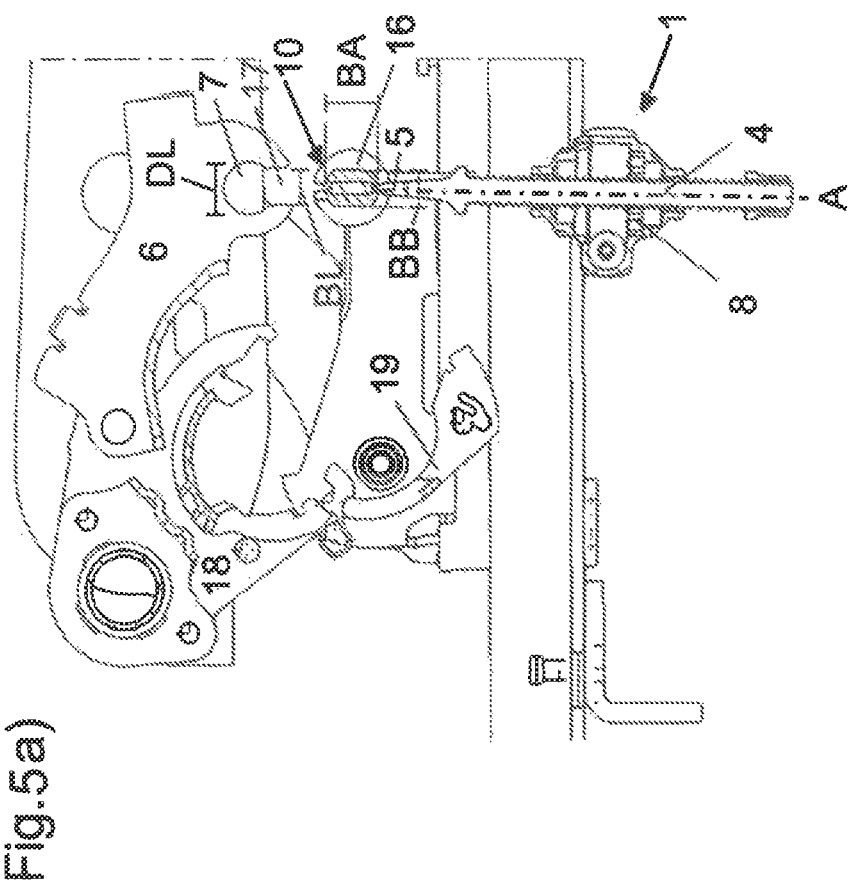

LINEAR ACTUATOR FOR A MOTOR VEHICLE SEAT

CROSS-REFERENCES TO RELATED APPLICATIONS

This application claims the priorities of German Patent Applications, Serial No. 20 2018 102 446.9, filed May 2, 2018, and 10 2019 111 242.7, filed Apr. 30, 2019, pursuant to 35 U.S.C. 119(a)-(d), the disclosures of which are incorporated herein by reference in its entirety as if fully set forth herein.

BACKGROUND OF THE INVENTION

The present invention relates to a linear actuator for adjusting a seat component of a motor vehicle seat.

The following discussion of related art is provided to assist the reader in understanding the advantages of the invention, and is not to be construed as an admission that this related art is prior art to this invention.

Adjustable motor vehicle seats allow the user to customize the adjustment of the motor vehicle seat. Accordingly, they provide comfort and safety for the user—for example, by enabling the user to maintain an adequate distance from built-in parts in the frontal region of the motor vehicle, and thus to reduce the risk of injury in the event of a rear-end collision, for example. To adjust the height of the seat support and its position in the longitudinal direction of the motor vehicle, a linear actuator is installed in the motor vehicle seat.

It would be desirable and advantageous to provide an improved linear actuator which obviates prior art shortcomings and which requires few components, is easy to assemble and install in a motor vehicle seat, and thus is of simple and inexpensive structure while yet being reliable in operation.

SUMMARY OF THE INVENTION

According to one aspect of the present invention, a linear actuator for adjusting a seat component of a motor vehicle seat includes a lead screw including a rod head, and a fastening means connected to the rod head and connectable to a first seat component of the motor vehicle seat, with the first seat component having a bearing, with the fastening means being insertable into the bearing in a first orientation and lockable in the bearing in a second orientation.

A linear actuator according to the invention has a lead screw with a rod head and a fastening means. The fastening means is designed in such a manner that it is connected to the rod head and can be connected to a first seat component of the motor vehicle seat. For this purpose, the first seat component has a bearing into which the fastening means can be inserted in a first orientation and can be locked in a second orientation.

For installation of the linear actuator in the motor vehicle seat, the linear actuator is inserted in a first orientation into the bearing. Then, the linear actuator is rotated into a second orientation. The fastening means mounted in the bearing forms the center of rotation in this case. The second seat component has a fastening device in which the end of the linear actuator opposite the fastening means is fastened. The installation of the linear actuator in the motor vehicle seat requires no tools and can be executed easily and quickly. The fastening means ideally includes a vibration-damping material—for example, a thermoplastic. Vibrations which occur during the adjustment of the linear actuator are damped by the vibration-damping material of the fastening means. In addition, the fastening means is inexpensive to produce.

According to another advantageous feature of the present invention, the fastening means can be connected to the rod head by a clip connection. The fastening means can be plugged onto the rod head and is fixed to the rod head by the clip connection. Establishing the connection requires no tools and only a small amount of time.

According to another advantageous feature of the present invention, the fastening means can be cylindrical. To install the linear actuator, the fastening means can be rotated in the bearing from a first into a second orientation due to this rotationally symmetrical design.

According to another advantageous feature of the present invention, the fastening means can include an opening which is suitable to receive the rod head. The opening is designed as a clip connection by which the rod head is connected to the fastening means.

According to another advantageous feature of the present invention, the opening of the fastening means can be broadened at its entry. The fastening means can be easily connected to the rod head with this design.

According to another advantageous feature of the present invention, a detent can be arranged in the opening of the fastening means. The detent is part of the clip connection, by means of which the fastening means and rod head can be easily and securely connected to each other.

According to another advantageous feature of the present invention, the rod head can have a recess into which the detent of the fastening means can be locked. Advantageously, the detent locks into the recess such that the fastening means and the rod head cannot be released by pulling along and in the direction of the sides of the lead screw. The detents of the clip connection can be designed as barbs for this purpose.

According to another advantageous feature of the present invention, the bearing of the first seat component can be annular, and the bearing also has an opening. The fastening means is inserted in a first orientation into the bearing through the opening. The annular design of the bearing allows rotation of the linear actuator into a second orientation.

According to another advantageous feature of the present invention, the inner diameter of the bearing can be greater than the width of the opening of the bearing. With this design, the fastening means can be locked in the bearing and cannot detach from the bearing.

According to another advantageous feature of the present invention, the fastening means can have an at least partially-circumferential groove. The annular bearing engages in the groove and thereby locks the fastening means.

According to another advantageous feature of the present invention, in a first cross-section running through the center of the groove, the fastening means can have a lesser width than the width in a second cross-section running through the center of the groove, wherein the first cross-section is perpendicular to the first orientation and the second cross-section is parallel to the first orientation. The fastening means has two differently sized cross-sections depending on the orientation of the fastening means, in such a manner that the fastening means in the first orientation can be inserted into the bearing through the opening in the bearing, and in the second orientation is designed to be able to lock in the bearing.

According to another advantageous feature of the present invention, the width of the fastening means in the first cross-section can be less than the width of the opening of the bearing. In addition, the width of the fastening means in the second cross-section is greater than the width of the opening and less than the inner diameter of the bearing. On account of this dimensioning, the fastening means can be inserted into the bearing in the first orientation through the opening in the bearing, and can be locked in the second orientation in the bearing.

According to another advantageous feature of the present invention, the linear actuator can have an engagement means which is engaged with the lead screw. The engagement means is, for example, a worm or lead screw nut around the lead screw. The motor shaft is then connected to a worm which drives a lead screw nut.

According to another advantageous feature of the present invention, the linear actuator can have a motor to drive the engagement means which is engaged with the lead screw. A motor—for example, an electric motor—allows a particularly comfortable linear adjustment of the lead screw in its longitudinal direction, and thus of the motor vehicle seat.

According to another advantageous feature of the present invention, the engagement means which is engaged with the lead screw is drivable. The lead screw is adjusted linearly in its longitudinal direction by the engagement means, for example, by motor or by a crank.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3a shows a spatial illustration of the fastening means;

FIG. 3b shows a side view of the fastening means;

FIG. 3c shows a frontal view of the fastening means;

FIG. 4a shows the installation of the linear actuator; first orientation;

FIG. 4b shows the installation of the linear actuator; first orientation; fastening means in the opening of the first seat component;

FIG. 4c shows the installation of the linear actuator; second orientation; fixation in the second seat component;

FIG. 5a shows the installation of the linear actuator; first orientation; dimensions of the linear actuator and the fastening devices;

FIG. 5b shows the installation of the linear actuator; first orientation; fastening means in the opening of the first seat component; and dimensions of the linear actuator and the fastening devices; and FIG. 5c shows the installation of the linear actuator; second orientation; fixation in the second seat component, and dimensions of the linear actuator and the fastening devices.

DETAILED DESCRIPTION OF PREFERRED EMBODIMENTS

Figure 1:
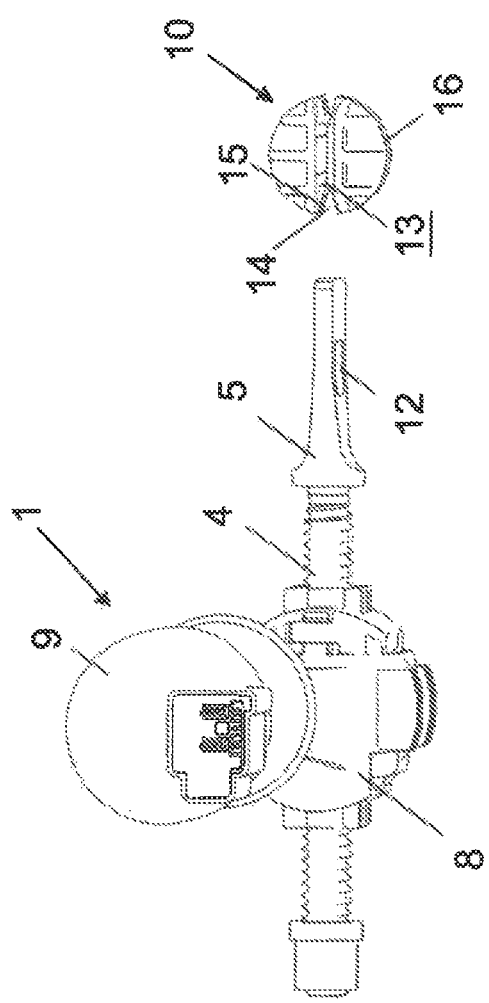
FIG. 1 shows an illustration of the linear actuator having fastening means.

Throughout all the figures, same or corresponding elements may generally be indicated by same reference numerals. These depicted embodiments are to be understood as illustrative of the invention and not as limiting in any way.

It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a linear actuator 1 according to the invention (FIG. 1) having a lead screw 4 with a rod head 5, an engagement means 8 which is in engagement with the lead screw 4, and a motor 9. The engagement means 8 is, for example, a worm and is driven by the motor 9, typically a cylindrically shaped electric motor. The lead screw nut executes a linear movement along the lead screw 4. The lead screw 4 has a rod head 5 on one end, which has a longitudinal recess 12 both on its top and on its bottom side, typically a hole in the rod head 5.

The fastening means 10 is cylindrical in shape and has an opening 13, an entry into the opening 14, and a broadening of the opening 15. The opening 13, the entry into the opening 14, and the broadening of the opening 15 are dimensioned so that the rod head 5 can be fitted into the fastening means 10. The fastening means 10 also has a circumferential groove 16.

Figure 2:
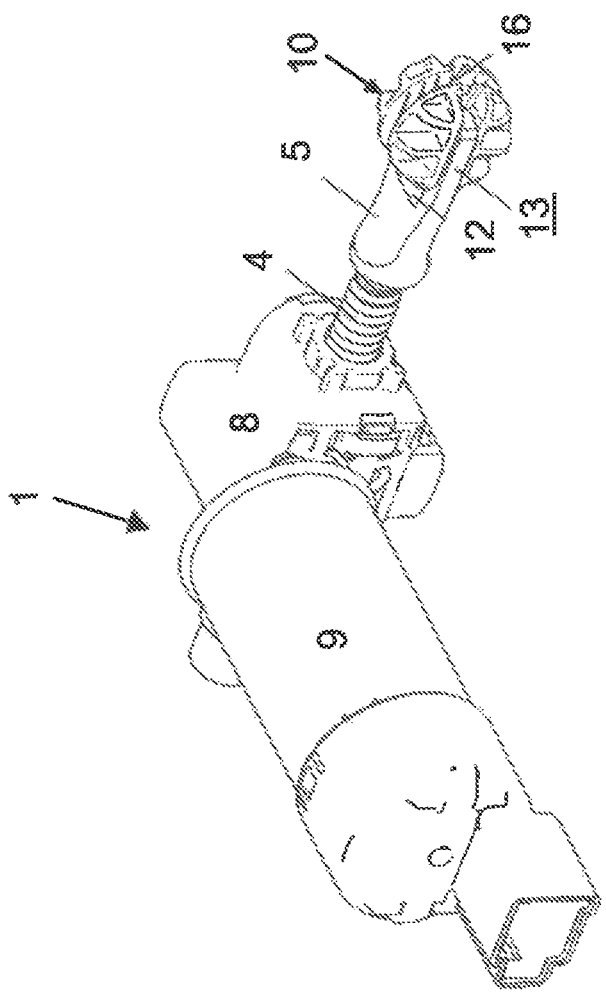
FIG. 2 shows a spatial illustration of the linear actuator connected to the fastening means.

FIG. 2 shows a spatial illustration of the linear actuator 1 according to the invention, with fitted fastening means 10. The linear actuator 1 has a lead screw 4, an engagement means 8 which is in engagement with the lead screw 4, and a motor 9. The motor 9 drives the lead screw 4 via the engagement means 8, which performs a linear movement along the lead screw 4. The lead screw 4 has a rod head 5 on one end, which has a longitudinal recess 12 on both its top and its bottom side. The rod head 5 is fastened to the lead screw 4 in such a way that its orientation does not change during the linear movement of the lead screw 4.

The fastening means 10 has a circumferential groove 16 which is inserted into a bearing 7 of the first seat component 6. The rod head 5 is fitted into the fastening means 10 in such a manner that the fastening means 10 is plugged onto the rod head 5. This design of the rod head 5 and the fastening means 10 requires no tools for assembly, and requires little time.

FIGS. 3a to 3b show detailed views of the fastening means 10. The fastening means 10 is cylindrical and has a circumferential groove 16. The rod head 5 is inserted into the opening 13 and plugged on. In order to facilitate the plug connection, the opening 13 has broadenings 15 on both sides of the opening 13. The detents 11', 11" of the clip connection 11 lock into the recesses of the rod head 12 in such a manner that the rod head 5 and fastening means 10 can be easily and simply connected, but once connected cannot be detached again by pulling along and in the direction of the sides of the lead screw 4. The detents 11', 11" of the clip connection 11 are ideally designed as barbs. With this design, the connection of the rod head 5 and fastening means 10 requires no tools and can be carried out quickly and easily. The width of the fastening means 10 in a first cross-section BA running through the center of the groove 16 is less than the width of the fastening means 10 in a second cross-section BB running through the center of the groove 16. This design allows the fastening means 10 to be fastened in a bearing 7 in the first seat component 6, for example, a seat support in a motor vehicle seat.

FIGS. 4a to 4c show the installation of the linear actuator 1 according to the invention in a motor vehicle seat. The linear actuator 1 has a lead screw 4, an engagement means 8 which is engaged with the lead screw 4, and the fastening means 10 fastened to the rod head 5 by means of the clip connection 11. The first seat component 6 has an annular bearing 7 which has an opening 17 on the underside. For installation of the linear actuator 1 in the motor vehicle seat, the linear actuator 1 is inserted in a first orientation A—typically a substantially vertical position of the linear actuator 1—through the opening 17 into the bearing 7, in such a manner that the bearing 7 receives the fastening means 10 (FIG. 4b). In a second step, the linear actuator 1 is rotated into a substantially horizontal orientation B. The fastening means 10 (FIG. 4c) mounted in the bearing 7 forms the center of rotation in this case. The second seat component 18 has a fastening device 19 in which the end of the linear actuator 1 opposite the fastening means 10 is fastened. Typically, the cylindrical motor 9 is mounted in the fastening device 19. The installation of the linear actuator 1 in the motor vehicle seat requires no tools and can be executed easily and quickly. Upon actuation of the linear actuator 1, the first seat component 6 is moved linearly relative to the second seat component 18; for example, the seat depth of a motor vehicle seat can be adjusted via the linear actuator 1. The linear actuator 1 is mounted in the fastening device of the second seat component 19 and in the bearing 7 of the first seat component 6 in a manner allowing pivoting, thereby compensating for small angular changes of the linear actuator 1 during the adjustment. Vibrations which occur during the adjustment of the linear actuator 1 are likewise damped by the vibration-damping material of the fastening means 10.

FIGS. 5a to 5c Illustrate the dimensions of the linear actuator 1 and the fastening devices. The linear actuator 1 has a lead screw 4, an engagement means 8 which is in engagement with the lead screw 4, and the fastening means 10 fastened to the rod head 5 by means of a clip connection 11. The first seat component 6 has an annular bearing 7 which has an opening 17 on the underside. For installation of the linear actuator 1 in the motor vehicle seat, the linear actuator 1 is inserted in a first, substantially vertical orientation A of the linear actuator 1, through the opening 17 and into the bearing 7 (FIG. 5b). The bearing 7 of the first seat component 6 has, on its underside, an opening 17 with a width BL which is greater than the width of the fastening means 10 in the cross-section BA running through the center of the groove 16 in this orientation of the fastening means 10. Thereafter, the linear actuator 1 is rotated into a substantially horizontal orientation B (FIG. 5c). The fastening means 10 mounted in the bearing 7 forms the center of rotation in this case. In this orientation B of the linear actuator 1, the width of the fastening means 10 in the cross-section BB running through the center of the groove 16 is greater than the width of the opening 17, and at the same time smaller than the inner diameter of the bearing DL. With this dimensioning of the fastening means 10, bearing 7, and opening 17, the fastening means 10 is locked in the bearing 7 and cannot detach from the bearing 7. The second seat component 18 has a fastening device 19 in which the end of the linear actuator 1 opposite the fastening means 10 is fastened.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A linear actuator for adjusting a seat component of a motor vehicle seat, said linear actuator comprising:
   a lead screw including a rod head; and
   a fastening means connectable to the rod head by a clip connection and connectable to a first seat component of the motor vehicle seat, with the first seat component having a bearing, said fastening means being insertable into the bearing in a first orientation and lockable in the bearing in a second orientation.

2. The linear actuator of claim 1, wherein the fastening means is cylindrical.

3. The linear actuator of claim 1, wherein the fastening means has an opening configured to receive the rod head.

4. The linear actuator of claim 3, wherein the opening of the fastening means has a broadening at an entry thereof.

5. The linear actuator of claim 3, wherein the fastening means includes a detent arranged in the opening of the fastening means.

6. The linear actuator of claim 5, wherein the rod head has a recess for locking of the detent of the fastening means in place.

7. The linear actuator of claim 1, wherein the bearing of the first seat component is configured in a shape of a ring, with the bearing having an opening.

8. The linear actuator of claim 7, wherein the bearing has an inner diameter which is greater than a width of the opening of the bearing.

9. The linear actuator of claim 1, wherein the fastening means has an at least partially-circumferential groove.

10. The linear actuator of claim 9, wherein in a first cross-section running through a center of the groove, the fastening means has a width which is less than a width in a second cross-section running through the center of the groove, wherein the first cross-section is perpendicular to the first orientation, and the second cross-section is parallel to the first orientation.

11. The linear actuator of claim 10, wherein the bearing has an inner diameter which is greater than a width of the opening of the bearing, wherein the width of the fastening means in the first cross-section is less than the width of the opening of the bearing, and the width of the fastening means in the second cross-section is greater than the width of the opening and less than the inner diameter of the bearing.

12. The linear actuator of claim 1, further comprising an engagement means in engagement with the lead screw.

13. The linear actuator of claim 12, further comprising a motor in driving relationship to the engagement means.

14. The linear actuator of claim 12, wherein the engagement means in engagement with the lead screw can be driven.

15. The linear actuator of claim 1, wherein the rod head and the fastening means are made in two parts.

16. A linear actuator for adjusting a seat component of a motor vehicle seat, said linear actuator comprising:
   a lead screw including a rod head; and
   a fastening means connected to the rod head and connectable to a first seat component of the motor vehicle seat, with the first seat component having a bearing, said fastening means being insertable into the bearing in a first orientation and lockable in the bearing in a second orientation, said fastening means having an opening configured to receive the rod head and having a broadening at an entry thereof.

17. A linear actuator for adjusting a seat component of a motor vehicle seat, said linear actuator comprising:
a lead screw including a rod head; and
a fastening means connected to the rod head and connectable to a first seat component of the motor vehicle seat, with the first seat component having a bearing, said fastening means being insertable into the bearing in a first orientation and lockable in the bearing in a second orientation, said fastening means having an opening and including a detent arranged in the opening of the fastening means.

* * * * *